United States Patent [19]

Ekstrom

[11] Patent Number: 4,804,645

[45] Date of Patent: Feb. 14, 1989

[54] CERAMIC MATERIAL BASED ON ALUMINA AND REFRACTORY HARD CONSTITUENTS

[75] Inventor: Claes T. Ekstrom, Stockholm, Sweden

[73] Assignee: Sandvik Aktiebolag, Sandviken, Sweden

[21] Appl. No.: 30,582

[22] Filed: Mar. 27, 1987

[51] Int. Cl.$^4$ ............ C04B 35/10; C04B 35/12; C04B 35/48

[52] U.S. Cl. .................... 501/105; 501/132; 501/95; 501/98; 501/87; 501/93; 501/104; 501/96

[58] Field of Search ............ 501/132, 105, 95, 98, 501/87, 93, 104, 96

[56] References Cited

U.S. PATENT DOCUMENTS

| | | | |
|---|---|---|---|
| 2,271,368 | 1/1942 | Fulcher et al. | 501/132 |
| 4,325,710 | 4/1982 | Tanaka et al. | 51/309 |
| 4,374,897 | 2/1983 | Yamaguchi | 428/446 |
| 4,533,647 | 8/1985 | Tien | 501/105 |
| 4,543,343 | 9/1985 | Iyori et al. | 501/87 |

Primary Examiner—William R. Dixon, Jr.
Assistant Examiner—David M. Brunsman
Attorney, Agent, or Firm—Burns, Doane, Swecker & Mathis

[57] ABSTRACT

The invention relates to a sintered body of a ceramic composite material based on alumina, refractory hard phases and $ZrO_2$, $HfO_2$ and/or partially stabilized $ZrO_2$ with a relative density of more than 98%. The sintered body according to the invention has chromium integrated in amounts corresponding to in all 1–20 weight % and $ZrO_2$, $HfO_2$ and/or partially stabilized $ZrO_2$ present as 2–16 weight % with these latter phases present to more than 70% in the tetragonal crystal modification. Furthermore, the refractory hard constituents are present as particles with a grain size of less than 10 μm and/or as whiskers or fibers with a diameter of less than 5 μm and a length/diameter ratio of >10.

9 Claims, No Drawings

CERAMIC MATERIAL BASED ON ALUMINA AND REFRACTORY HARD CONSTITUENTS

The present invention relates to a ceramic material and a method of producing the same. The material has exceptionally good properties as an engineering ceramic material or as a cutting tool for machining of metals. More particulary, the invention relates to a material based on alumina where the wear resistance and toughness have been increased by a favorable microstructure and phase composition. The addition of refractory hard constituents in combination with chromium-containing phases and zirconia forms the basis for the favorable properties.

Several recent improvements in materials technology have now made it possible to produce ceramics with much improved mechanical properties. This, in combination with other good properties such as temperature, corrosion and erosion resistance and low weight have made ceramics even more interesting for new applications such as motor parts, heat exchangers, cutting tools for machining of metals, bearings tec. The potential for ceramics as high performance material is considered very great. The generally good physical properties of ceramic materials give a possibility to meet the ever increasing demands on the material within e.g. the engineering-, space-, offshore, electronics and bio-industry. Apart from possibilities to meet still higher demands in new areas, the introduction of high performance ceramics can be a suitable substitute for materials in existing constructions.

The application areas which at long sight will be able to use the special properties of the ceramic materials are high temperature application such as combustion motors. In this application very large gains of energy can be obtained by the possibility of higher working temperature and related higher efficiency. Other important factors for the use of ceramic components is the possibility of lower weight.

Wear term applications of ceramic materials use their wear and corrosion resistance. In particular, the use as cutting tools for the machining of metals, which is a well established product, can be mentioned. In addition as bearings and seals, etc, in pumps, etc in highly corrosive environments in chemical industry, ceramic materials such as alumina already have an important function.

Great efforts have been made to improve the mechanical properties of ceramic material and laboratory and pilot scale tests have given very promising results. For many materials flexure strength levels of >500 MPa are reported. The compressive strength for ceramic materials is generally very high.

Ceramic materials show in general high theoretical strength, which can be determined from the binding energy of the atoms. However, this is not met in practice today. A difficulty for a more general use of ceramic engineering materials is the brittleness of the materials, which results in great sensitivity for overload and thermoshocks, as well as a tendency to scatter in the strength data. Some ways of meeting the brittleness of the ceramic materials and related low fracture toughness are the use of so called strengthening mechanisms (stress induced phase transformation, microcrack strengthening and deflection strengthening) and fiber reinforcement (ceramic fibers or whiskers in a ceramic matrix). In those ways, the fracture toughness level of such composite materials approaches that of cemented carbide and brittle steels. The ceramic materials which have attracted most attention are composites based on $Al_2O_3$, $ZrO_2$, $Si_3N_4$ or SiC.

Another problem at present is the poor reproducibility. This again relates to the brittleness and low fracture toughness of the ceramic materials, which results in that the maximum allowed defect size (microcracks, pores, larger grains or crystals) only may be 10–20$\mu$m compared to >100$\mu$m for metals. This leads to very great demands on the purity of the raw material and absence of foreign particles as well as on the process steps in order not to introduce such defects.

Also, the machining of ceramic sintered bodies easily results in surface damages, which can be strength determining. Due to their brittleness, ceramic materials are generally "non-forgiving" in their nature, i.e., a single defect (weakest link) causes fracture.

The fracture toughness for ceramic cutting materials is of vital importance. Conventional monolithic ceramic materials have as a rule relatively low fracture toughness with the exception of composite materials where $ZrO_2$ or partially stabilized $ZrO_2$ is present. The tetragonal modification of $ZrO_2$ can be held metastable in a densely sintered ceramic body or by addition prior to sintering of low amounts of $Y_2O_3$, MgO and/or CaO to $ZrO_2$ into the composite. Monolithic materials such as SiC and $Al_2O_3$ on the other hand, have a low fracture toughness of 3–5 MPa m$^{\frac{1}{2}}$ and a strength level of 200–500 MPa.

Ceramic cutting tools for the machining of metals based on alumina are characterized by an extremely good chemical stability so that they can be used at high cutting speed in chip forming machining without being worn due to oxidation or chemical dissolution. A serious limitation for the use of a pure alumina material is, however, the great sensititivity of this material for mechanical shocks which effectively reduces the usefulness in intermittent cutting operations such, as, e.g., milling.

It is well known that the feature toughness of ceramic materials can be considerably improved by mixing in fibers or whiskers. With whiskers is generally meant very thin, hair-like single crystals <5$\mu$m in diameter, often <2$\mu$m in diameter, and with a length to diameter ratio >10. The fiber materials are always polycrystalline and as a rule with diameters >5$\mu$m. For example, it is well described in the literature how thin whiskers of SiC in an $Al_2O_3$ matrix has a very favorable effect such as a doubled fracture toughness, a much better rupture strength and a more than doubled reliability with a sufficient added amount of whiskers. However, the SiC-whisker reinforced alumina materials are difficult to densify to the high densities required to utilize the enhanced material properties. Pressureless sintering techniques can only be used for low amounts of added SiC-whiskers, which does not give optimal reinforcement. For higher amounts, more expensive hot pressing or hot isostatic pressing must be applied.

These improvements have opened the possiblities for many applications where the mechanical performance has been a limiting factor and the many advantages of the ceramic matrices such as alumina have not been utilized. An important such application is the use of ceramic materials for cutting machining e.g. turning, milling, drilling etc. Also in high temperature applications such as in combustion motors or gasturbines, the improved performance has opened new possibilities.

It is finally also known that the mixing of particles of hard constituents in alumina based ceramic materials has a favorable influence on, e.g., the wear resistance. For example, the addition of TiC or TiN to alumina gives a material which has extremely good properties as an indexable cutting tool insert in certain metal machining operations.

As to production considerations, a strongly limiting factor is that the refractory hard constituent phase, regardless of if it is in particle or fiber form, can not be sintered to high density at the volume fractions which are desired for optimum effect without using special methods such as hot pressing. It is an expensive technique and also limits the possibility of producing more complicated shapes. The addition of metal oxides to alumina and how this addition influences the sinterability and structure have been studied for a long time. Most metal oxides have a negative influence, e.g., low density or abnormal grain growth on alumina. As an example, we have found additions of chromic oxide ($Cr_2O_3$) alone to alumina to promote abnormal grain growth when sintering under an inert atmosphere. However, we suprisingly have found that when using chromic oxide additions to alumina together with a proper combination of hard constituents or oxides from group IVB, VB or VIB, this negative behaviour does not occur. Instead, an extremely fine-grained, uniform and dense composite has been obtained. We have found that the hardness and chemical stability of this composite is very high, in combination with a significantly increased toughness behavior. The increase in toughness is especially pronounced when the hard constituent is added in fiberlike form, e.g. by additions of TiN or TiC whiskers to alumina in the presence of $ZrO_2$ and the chromia addition is more than 2 weight % but not higher than 10 weight %. Tests of this composite as cutting tool materials confirm a very good.

Further experiments have shown that by small additions of oxides other than $Cr_2O_3$ from group IVB, VB or VIB, preferably together with hard refractory compounds such as the carbides, nitrides or borides from the same groups of the periodic table, alumina-composites can be more easily sintered. It seems that the oxides, more or less by a reaction to form phases such as oxycarbides through some intermediate liquid phase in grain boundaries, etc, help the sintering. In this way, pressureless sintering of composite materials has been possible. However, no such pronounced good effects as obtained by chromic oxides or chromic compounds that decompose to an oxide during heating, has been seen.

By combining different oxides, one of them being chromia, and hard constituents, ceramic composite materials with demanded properties can be tailor made. As an example, it can be mentioned that additions of about 7% chromic oxide, 2% zirconia, and 30% of a titanium nitride - titanium carbide mixture to alumina gave a remarkable composite material by a pressureless sintering at 1600° C. under a protecting atmosphere of nitrogen. The Vickers hardness was better than that of alumina ceramic and the fracture toughness had increased considerably. The material was dense, fine-grained, about or less than 1μm, and had an excellent metal cutting tool behavior. Very little or no "sintering skin" i.e. a zone of altered surface structure, was seen. This surface zone normally occurs when high temperature processes are used due to reaction between surrounding gas and sintered body. Complex shapes can thus be sintered at low temperatures to final form and no or very little grinding or postshaping will be needed. As a comparison, it can be mentioned that additions of only 7% chromic oxide to alumina or 7% chromic oxide plus 2% $ZrO_2$ to alumina gave no dense materials at sintering temperatures below 1600 ° C. and abnormal grain growth at higher temperatures.

A series of experiments were made to study the influence on the microstructure of an alumina material containing hard constituents of TiN and/or TiC by altering the amounts of added $ZrO_2$ and $Cr_2O_3$. Electron microprobe analysis revealed several surprising positive effects on the microstructure by the addition of $Cr_2O_3$. If only $ZrO_2$ is added, a small positive effect can be noted on the density of the sintered material, but still a very high sintering temperature of about 1800 ° C. is needed. The obtained structure is coarse grained, 2–4μm, and the added $ZrO_2$ had either reacted with the hard constituent forming nonhomogeneous titanium-zirconium phases, type $Ti,Zr(C,N,O)$, or transformed to a nonactive phase, i.e., does not remain in the active metastable tetragonal form. Measured fracture toughness values were low. Additions of $Cr_2O_3$ together with $ZrO_2$ showed, as mentioned before, that the sintering temperatures could be decreased to about 1600 ° C. and the densities were still very high. A very even fine-grained, <1μm, microstructure was obtained. The added $ZrO_2$ had not reacted further but remained to a high degree in the tetragonal form in the structure. The addition of $Cr_2O_3$ seems further to purify the grain boundaries, as Si and other impurities from the raw materials were enriched in very small amounts of crystalline phases and did not remain as a glassy film which is known to especially deteriorate high temperature properties. Measurements on the chromium-containing materials showed that they had a high hardness, $HV1 > 1900$, and a significantly higher fracture toughness, $K_{IC} > 5$ MPa $m^{\frac{1}{2}}$.

The present invention, thus, concerns a material with extraordinary properties based on alumina. The material of the present invention combines the advantages obtained by the additions of refractory hard constituents with an improved fracture toughness. By a favorable choice of microstructure and phase composition, a better combination of properties than previously known composites based on alumina have been obtained. Another aspect of the present invention is a method to obtain such a material by so-called pressureless sintering.

This new composite material can be sintered at such low temperatures that several advantages can be obtained. A more fine grained microstructure will give enhanced mechanical properties. Surface reactions with surrounding gas atmosphere during sintering will be minimized or a "sintering skin" will even be absent. Zirconia or hafnia, which greatly improve the toughness of the ceramic composite by transformation toughening mechanisms, can be added without being transformed to other inactive compounds. Typically, additions of zirconia or hafnia and sintering at higher temperatures under a protective nitrogen atmosphere will transform these compounds to oxynitrides or nitrides, which will deteriorate the good properties. It is important that the added $ZrO_2$, $HfO_2$ or partly stabilized zirconia to a high degree remain in a metastable tetragonal modification in the sintered material at low temperature. The relative amount of $ZrO_2$ in the tetragonal form shall be higher than 70% as determined by X-ray diffraction analysis, preferably higher than 80%. The total amount of added $ZrO_2$ shall fall in the range of 2-16 weight %, preferably 2-10 weight %.

Refractory materials such as carbides, nitrides or borides are particularly suited for the in alumina compositions in amounts of 5-50, preferably 10-40, weight %. These may be present alone or in combination or as mixed cyrstals, e.g., titaniumcarbonitride. Particularly suited are carbides, nitrides or borides from group IVB, VB or VIB of the periodical system, preferably titanium, zirconium, molybdenum or tungsten.

The refractory material may be present both as particles and/or as whiskers or fibers. To obtain a favorable microstructure, the refractory particles must have a mean grain size less than 10μm, preferably less than 5μm. Whiskers or fibers shall correspondingly have a diameter less than 5μm preferably less than 2μm, and a length/diameter ratio of >10, preferably >15.

The added amount of refractory whiskers or fibers shall be higher than 5 weight %, preferably higher than 10 weight %, to obtain a good strengthening effect on the alumina matrix, but less than 40 weight %. Whiskers of TiN, TiC and $TiB_2$ or mixed compounds of these phases in whisker form is especially suited. The relative density shall be higher than 98% of theoretical density (TD), preferably higher than 99% TD. Simultaneous addition of $ZrO_2$ or $HfO_2$ in amounts higher than 2 weight % and chromia higher than 1 weight % is necessary.

We have found that in order to get optimal properties the phase composition of the ceramic composite apart from alumina and the refractory hard phases shall contain $ZrO_2$, $HfO_2$ and/or partally stabilized $ZrO_2$. The amount of $ZrO_2$, etc added shall be in the range of from 2-16 weight %, preferably 2-10 weight % and the amount of tetragonal $ZrO_2$ shall be >70%, preferably >80%, of the $ZrO_2$ present as determined by X-ray diffraction analysis of the sintered material. Chromium must also be present integrated in one of the above mentioned phases mainly in alumina and/or in the refractory phases, but may also be present as discrete chromium containing phases in the structure. Chromium should be present totally in an amount corresponding to 1-20 weight %, preferably 2-10 weight %, calculated as $Cr_2O_3$. The material shall be densely sintered with a relative density of more than 98% preferably more than 99%. Chromium may also be added in the form of other mixed oxides, hydroxide, etc, which during the heating or sintering step decompose or transform into chromium containing oxide phases.

The invention is additionally illustrated in connection with the following Examples which are to be considered as illustrative of the present invention. It should be understood, however, that the invention is not limited to the specific details of the Examples.

EXAMPLE 1

(COMPARATIVE)

Alumina and zirconia raw materials were carefully milled to submicron size. The milled materials were dried, granulated and pressed to powder compacts. Sintering was made at 1600° C. in air for 2 hours. The resulting densities are shown in the table below. The results were better than 98% of TD (theoretical density) but not better than 99% of TD for higher $ZrO_2$ additions. X-ray diffraction measurements showed that the relative amount of tetragonal $ZrO_2$ were high at the lower additions of $ZrO_2$, but declined to 75% of tetragonal $ZrO_2$ at the 16 weight % addition of $ZrO_2$. This example shows that not more than 16 weight % $ZrO_2$ can be added if the tetragonal fraction should exceed 70%.

To achieve a density higher than 99% of TD a post-HIP (hot isostatic pressing) at 1500° C. and 100 MPa during 1 hour was undertaken. The relative amount of tetragonal $ZrO_2$ did not change by this extra process step.

| Added $ZrO_2$, weight % | % as tetrag $ZrO_2$ | Sintering % TD | Post-HIP % TD |
| --- | --- | --- | --- |
| 0 | — | 99.1 | 99.8 |
| 2 | 96 | 99.0 | 99.8 |
| 4 | 93 | 98.9 | 99.6 |
| 6 | 85 | 98.9 | 99.7 |
| 8 | 79 | 98.8 | 99.8 |
| 16 | 75 | 98.7 | 99.9 |
| 20 | 67 | 98.5 | 99.7 |
| 24 | 62 | 98.2 | 99.5 |

EXAMPLE 2

(COMPARATIVE)

Alumina and titanium nitride raw materials were carefully milled to submicron size. The milled materials were dried, granulated and pressed to powder compact. Sintering was made at 1775° C., in a protecting nitrogen atmosphere for 2 hours. The obtained densities are shown in the table. The obtained densities are better than 98% TD up to about 25 weight % TiN-additions, but never better than 99% of TD with a TiN addition. A post-HIP treatment at 1600° C. and 100 MPa during 2 hours is necessary to give improved densities. This example shows that addition of a typical hard constituent such as TiN, despite high sintering temperature, does not give acceptable densities for additions higher than 10 weight %.

| Added TiN, weight % | Sintering % TD | Post-HIP % TD |
| --- | --- | --- |
| 0 | 99.1 | 99.8 |
| 10 | 98.9 | 99.7 |
| 20 | 98.3 | 99.3 |
| 30 | 97.6 | 99.4 |
| 40 | 96.9 | 99.1 |
| 50 | 95.7 | 98.8 |

EXAMPLE 3

A number of alumina materials with added $ZrO_2$, TiN, TiC and $Cr_2O_3$ were processed. The materials No 1-9 were sintered at 1775° C. for 2 hours in nitrogen. All sintered blanks at 1775° C. had a "sintering skin" of about 0.1-0.2 mm. Two of the materials (No 2, 4) were post-HIP at 1600° C. and 100 MPa for 2 hours. Materials No 10-20 were sintered at 1650° C. for 1 hour and no significant "sintering skin" layer could be found. Materials according to the invention are No. 10-15 and 17-20. For all these materials very good densities have been obtained, despite lower sintering temperatures. Also in those cases the $ZrO_2$ is present and the amount of tetragonal $ZrO_2$ is high.

| No | Additions (weight %) | % TD | % as $ZrO_2$ (tetr.) | Note |
| --- | --- | --- | --- | --- |
| 1 | 30% TiN | 97.6 | — | |

-continued

| No | Additions (weight %) | % TD | % as ZrO$_2$ (tetr.) | Note |
|---|---|---|---|---|
| 2 | 30% TiN | 99.4 | | Post-HIP |
| 3 | 23% TiN, 7% TiC, 2% ZrO$_2$ | 98.5 | >90 | |
| 4 | 23% TiN, 7% TiC, 2% ZrO$_2$ | 99.8 | >90 | Post-HIP |
| 5 | 15% TiN, 15% TiC | 96.4 | | |
| 6 | 15% TiN, 15% TiC, 2% ZrO$_2$ | 97.8 | >90 | |
| 7 | 30% TiN, 2% ZrO$_2$ | 98.8 | 68 | |
| 8 | 30% TiN, 4% ZrO$_2$ | 99.5 | 48 | |
| 9 | 30% TiN, 8% ZrO$_2$ | 99.3 | 33 | |
| 10 | 23% TiN, 7% TiC, 3.5% Cr$_2$O$_3$ | 99.0 | >90 | |
| 11 | 23% TiN, 7% TiC, 4% ZrO$_2$, 7.0% Cr$_2$O$_3$ | 99.2 | 86 | |
| 12 | 23% TiN, 7% TiC, 10.5% Cr$_2$O$_3$ | 100.0 | >90 | |
| 13 | 23% TiN, 7% TiC, 8% ZrO$_2$, 3.5% Cr$_2$O$_3$ | 99.2 | 92 | |
| 14 | 23% TiN, 7% TiC, 8% ZrO$_2$, 10.5% Cr$_2$O$_3$ | 99.2 | 96 | |
| 15 | 23% TiN, 7% TiC, 2.5% ZrO$_2$, 6.3% Cr$_2$O$_3$ | 99.7 | 93 | |
| 16 | 23% TiN, 7% TiC, 2% ZrO$_2$ | 93.8 | >90 | |
| 17 | 23% TiN, 7% TiC, 1% ZrO$_2$, 6% Cr$_2$O$_3$ | 99.8 | >90 | |
| 18 | 23% TiN, 7% TiC, 6% Cr$_2$O$_3$ 1% ZrO$_2$ | 98.1 | >90 | |
| 19 | 23% TiN, 7% TiC, 1% Cr$_2$O$_3$ 8% ZrO$_2$ | 98.1 | 76 | |
| 20 | 23% TiN, 7% TiC, 2% ZrO$_2$, 2% Cr$_2$O$_3$ | 98.6 | >90 | |

Cutting tool inserts of type SNGN 120412 were ground from the blanks of the materials No 2,3,4,8,9,10,11,12,13,14 and 15. Materials 10–15 are made according to the invention. The following performance tests were made.

A. Life time in steel SS 2310 (HRC 64). By continuous turning with the speed 60 m/min., feed rate 0.23 mm/rev. and depth of cut 0.5 mm. Lifetime criteria was fracture and the given value is a mean of six tests.

| Material | Life time (min) |
|---|---|
| 2 | 4.87 |
| 3 | 2.99 |
| 4 | 3.61 |
| 8 | 0.54 |
| 9 | 0.54 |
| 10 | 5.65 |
| 11 | 7.29 |
| 12 | 4.49 |
| 13 | 6.93 |
| 14 | 5.58 |
| 15 | 8.21 |

B. Cast iron intermittent turning (SS 0125) in special work piece to test the edge fracture toughness. Speed 400 m/min, feed rate 0.20 mm/rev. and depth of cut 2 mm. Life time criteria was fracture and the given value is a mean of 15 tests.

| Material No | Life time (min) |
|---|---|
| 2 | 1.48 |
| 3 | 1.31 |
| 4 | 1.67 |
| 8 | 2.49 |
| 9 | 2.59 |
| 10 | 1.28 |
| 11 | 2.20 |
| 12 | 1.63 |
| 13 | 2.45 |
| 14 | 2.33 |
| 15 | 1.27 |

C. Wear resistance in cast iron turning (SS 0125) with the speed 600 m/min, feed rate 0.25 mm/rev. and depth of cut 1.0 min.

| Material No | Rel. flank wear rate | |
|---|---|---|
| | after 10 min | after 20 min |
| 2 | 108 | 101 |
| 3 | 100 | 100 |
| 4 | 101 | 100 |
| 8 | 98 | 99 |
| 9 | 100 | 100 |
| 10 | 142 | 135 |
| 11 | 131 | 138 |
| 12 | 118 | 120 |
| 13 | 135 | 129 |
| 14 | 130 | 122 |
| 15 | 110 | 115 |

D. Life time in turning of steel (SS 2541-03) with the cutting speed 475 m/min, feed rate 0.30 mm/rev. and depth of cut 2 mm. Life time criteria was fracture and the given value is a mean of 3 tests.

| Material No | Relative life time |
|---|---|
| 2 | 1.2 |
| 3 | 1.2 |
| 4 | 0.8 |
| 8 | 0.5 |
| 9 | 1.0 |
| 10 | 1.5 |
| 11 | 1.4 |
| 12 | 1.0 |
| 13 | 1.6 |
| 14 | 1.4 |
| 15 | 1.5 |

E. Cast iron intermittent turning (SS 0125) in special work piece to test the bulk fracture toughness. Cutting speed 500 m/min, feed rate 0.50 mm/rev. and depth of cut 0.3 mm. Life time criteria was fracture and the given value is a mean of 21 tests.

| Material No | Life time (min) |
|---|---|
| 3 | 1.41 |
| 10 | 1.66 |
| 11 | 2.62 |
| 12 | 1.82 |
| 13 | 3.91 |
| 14 | 2.56 |
| 15 | 3.09 |

EXAMPLE 4

Continuous turning of ball bearing rings in hardened steel (HRC 62). Cutting speed 70 m/min, feed rate 0.7 mm/rev., depth of cut 0.5 mm, no cutting fluid and insert type RNGN 120800. Tool life is an average of 3 tests.

Material No 3 and No 15 given in example 3 were used. The tool life with material No 3 was five complete articles and with material No 15, 58 articles were made.

EXAMPLE 5

Hot hardness has been measured with Vickers indentation method and 1000 g load. Materials 2,3,8 and 15 from example 3. As a reference material alumina with 4 weight % $ZrO_2$ has been used. Material No. 15 according to the invention shows an improved hot hardness.

| Material No | RT | Temperature 500° C. | 1000° C. |
|---|---|---|---|
| 2 | 2050 | 1240 | 760 |
| 3 | 2190 | 1280 | 810 |
| 8 | 1840 | 1050 | 650 |
| 15 | 2100 | 1320 | 990 |
| Ref. | 1980 | 1180 | 730 |

EXAMPLE 6

A series of alumina materials all containing 23 weight % TiN and 7 weight % TiC as hard constituents were sintered with different metal oxide additions at low temperatures. The results are summarized in the table below.

| Added oxides (weight %) | Sintering Temp. °C. | Time | % TD (h) | % $ZrO_2$ (tetr.) |
|---|---|---|---|---|
| | 1600 | 1 | 87.3 | — |
| | " | 2 | 88.5 | — |
| | 1650 | 1 | 88.1 | — |
| | " | 2 | 89.7 | — |
| | 1700 | 1 | 90.4 | — |
| | " | 2 | 91.8 | — |
| 3.5% $Cr_2O_3$ | 1600 | 1 | 96.2 | — |
| | " | 2 | 97.3 | — |
| | 1650 | 1 | 97.9 | — |
| | " | 2 | 98.6 | — |
| | 1700 | 1 | 99.4 | — |
| | " | 2 | 99.7 | — |
| 4% $ZrO_2$, 7% $Cr_2O_3$ | 1600 | 1 | 98.4 | 86 |
| | " | 2 | 99.1 | 93 |
| | 1650 | 1 | 99.5 | 92 |
| | " | 2 | 99.5 | 92 |
| | 1700 | 1 | 99.8 | 79 |
| | " | 2 | 99.7 | 82 |
| 2.0% $ZrO_2$, 10.5% $Cr_2O_3$ | 1600 | 1 | 99.6 | >90 |
| | " | 2 | 100.0 | >90 |
| | 1650 | 1 | 100.0 | >90 |
| | " | 2 | 100.0 | >90 |
| | 1700 | 1 | 100.0 | >90 |
| | " | 2 | 100.0 | >90 |
| 8% $ZrO_2$, 3.5% $Cr_2O_3$ | 1600 | 1 | 99.3 | 83 |
| | " | 2 | 99.3 | 87 |
| | 1650 | 1 | 99.7 | 90 |
| | " | 2 | 99.3 | 80 |
| | 1700 | 1 | 99.7 | 84 |
| | " | 2 | 99.8 | 83 |
| 12% $ZrO_2$, 12% $Cr_2O_3$ | 1600 | 1 | 99.2 | 50 |
| | " | 2 | 99.6 | 56 |
| | 1650 | 1 | 99.2 | 39 |
| | " | 2 | 99.2 | 53 |
| | 1700 | 1 | 99.2 | 30 |
| | " | 2 | 99.6 | 31 |
| 4% $ZrO_2$, 10.5% $Cr_2O_3$ | 1600 | 1 | 99.4 | 74 |
| | " | 2 | 99.5 | 76 |
| | 1650 | 1 | 99.5 | 70 |
| | " | 2 | 99.7 | 71 |
| | 1700 | 1 | 99.8 | 65 |
| | " | 2 | 99.8 | 68 |
| 2% $ZrO_2$, 1% $MoO_3$ | 1600 | 2 | 93.2 | not detectable |
| | 1650 | 1 | 95.3 | " |
| 2% $ZrO_2$, 6% $MoO_3$ | 1600 | 2 | 91.2 | " |
| | 1650 | 1 | 92.0 | " |
| 2% $ZrO_2$, 10% $MoO_3$ | 1600 | 1 | 89.5 | " |
| | 1650 | 1 | 92.2 | " |
| 2% $ZrO_2$, 6% $WO_3$ | 1600 | 2 | 94.7 | " |
| | 1650 | 1 | 95.3 | " |
| 2% $ZrO_2$, 6% $V_2O_5$ | 1600 | 2 | 92.7 | " |
| | 1650 | 1 | 93.0 | " |
| 2% $ZrO_2$, 6% $Nb_2O_5$ | 1600 | 2 | 97.8 | >90 |
| | 1650 | 1 | 98.6 | >90 |
| 2% $ZrO_2$, 10% $Nb_2O_5$ | 1600 | 2 | 98.8 | >90 |
| | 1650 | 1 | 99.1 | >90 |
| 2% $ZrO_2$, 6% $Fe_2O_3$ | 1600 | 2 | 92.4 | not detectable |
| | 1650 | 1 | 92.1 | " |

Materials according to the invention give in general very high densities also at sintering temperatures as low as 1600 ° C. It is also apparent that oxide additions from group IVB, VB or VIB increase the sinterability compared with no additions.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A sintered body of a ceramic composite material comprising alumina, an amount sufficient to improve the fracture toughness of particles and/or whiskers or fibers of refractory hard constituents of one or more metals of the elements Group IVB, VB or VIB of the periodic system, said refractory hard constituent particle having a grain size less than 10 $\mu$m, said refractory hard constituent whisker or fiber having a diameter less than 5 $\mu$m and a length/diameter ratio of greater than 10, from 2-16 weight % of $ZrO_2$, $HfO_2$ and/or partially stabilized $ZrO_2$ with more than 70% of said $ZrO_2$, $HfO_2$ and/or partially stabilized $ZrO_2$ present in the tetragonal crystal modification, chromium present in amounts corresponding to a total of from 1-20 weight % as $Cr_2O_3$, and said sintered body having a relative density greater than 98%.

2. Sintered body according to claim 1 in which the refractory hard constituent is one or more nitrides, carbides or borides of the elements titanium, zirconium, molybdenum or tungsten.

3. A sintered body according to claim 2 in which the refactory hard constituent is present in and out from 5-50 weight %.

4. A sintered body according to claim 3 in which the refractory hard constituent is present in the amount of from 10-40% by weight.

5. A sintered body according to claim 3 in which the refractory hard constituent is a carbide, nitride or boride of titanium.

6. A sintered body according to claim 3 in which the density is greater than 99%.

7. A sintered body according to claim 3 in which the chromium is added as chromia.

8. Sintered body according to claim 1 in which the refractory hard phases are present as whiskers of one or more of TiN, TiC, $TiB_2$.

9. A sintered body according to claim 1 in which the whiskers or fibers have a diameter less than 2 $\mu$m in diameter.

* * * * *